United States Patent [19]
Benson et al.

[11] Patent Number: 5,580,598
[45] Date of Patent: Dec. 3, 1996

[54] MULTI-PRODUCT FOOD COOKING SYSTEM

[75] Inventors: Clark K. Benson, Millbrae; Andrew A. Caridis, San Carlos, both of Calif.

[73] Assignee: Heat and Control. Inc., San Francisco, Calif.

[21] Appl. No.: 552,804

[22] Filed: Nov. 3, 1995

[51] Int. Cl.⁶ .............................. A23L 1/00; A47J 37/00; A47J 37/12
[52] U.S. Cl. .............................. 426/438; 99/330; 99/404; 99/407; 426/519; 426/523
[58] Field of Search ................ 99/330, 339, 403–406, 99/407, 408, 386, 443 C, 352–355; 426/438, 508–511, 519, 233, 490, 492, 441, 637

[56] References Cited

U.S. PATENT DOCUMENTS

| | | | |
|---|---|---|---|
| 4,167,585 | 9/1979 | Caridis et al. | 426/523 X |
| 4,269,861 | 5/1981 | Caridis et al. | 426/438 |
| 4,325,295 | 4/1982 | Caridis et al. | 99/339 |
| 4,366,749 | 1/1983 | Caridis et al. | 99/355 X |
| 4,392,420 | 7/1983 | Caridis et al. | 99/406 |
| 4,738,193 | 4/1988 | Benson et al. | 99/404 |
| 4,942,808 | 7/1990 | Benson et al. | 99/404 |
| 4,977,821 | 12/1990 | Benson et al. | 99/407 |
| 5,075,120 | 12/1991 | Leary et al. | 426/233 |
| 5,112,633 | 5/1992 | Benson et al. | 426/519 X |
| 5,137,740 | 8/1992 | Benson et al. | 426/438 |
| 5,167,979 | 12/1992 | Benson et al. | 426/490 X |
| 5,407,692 | 4/1995 | Caridis et al. | 426/510 |

*Primary Examiner*—Timothy F. Simone
*Attorney, Agent, or Firm*—Flehr, Hohbach, Test, Albritton & Herbert; Donald N. MacInosh

[57] ABSTRACT

Dual zone cooking process and apparatus are provided for cooking a wide variety of different snack food products in a continuous manner, the apparatus being arranged in modular form for conversion from one cooking process to another. Products are cooked either in two tandem but separated cook zones or in a final cook zone at cook times and temperatures applicable for the particular products. Oil volumes are variable in the cooking apparatus.

14 Claims, 7 Drawing Sheets

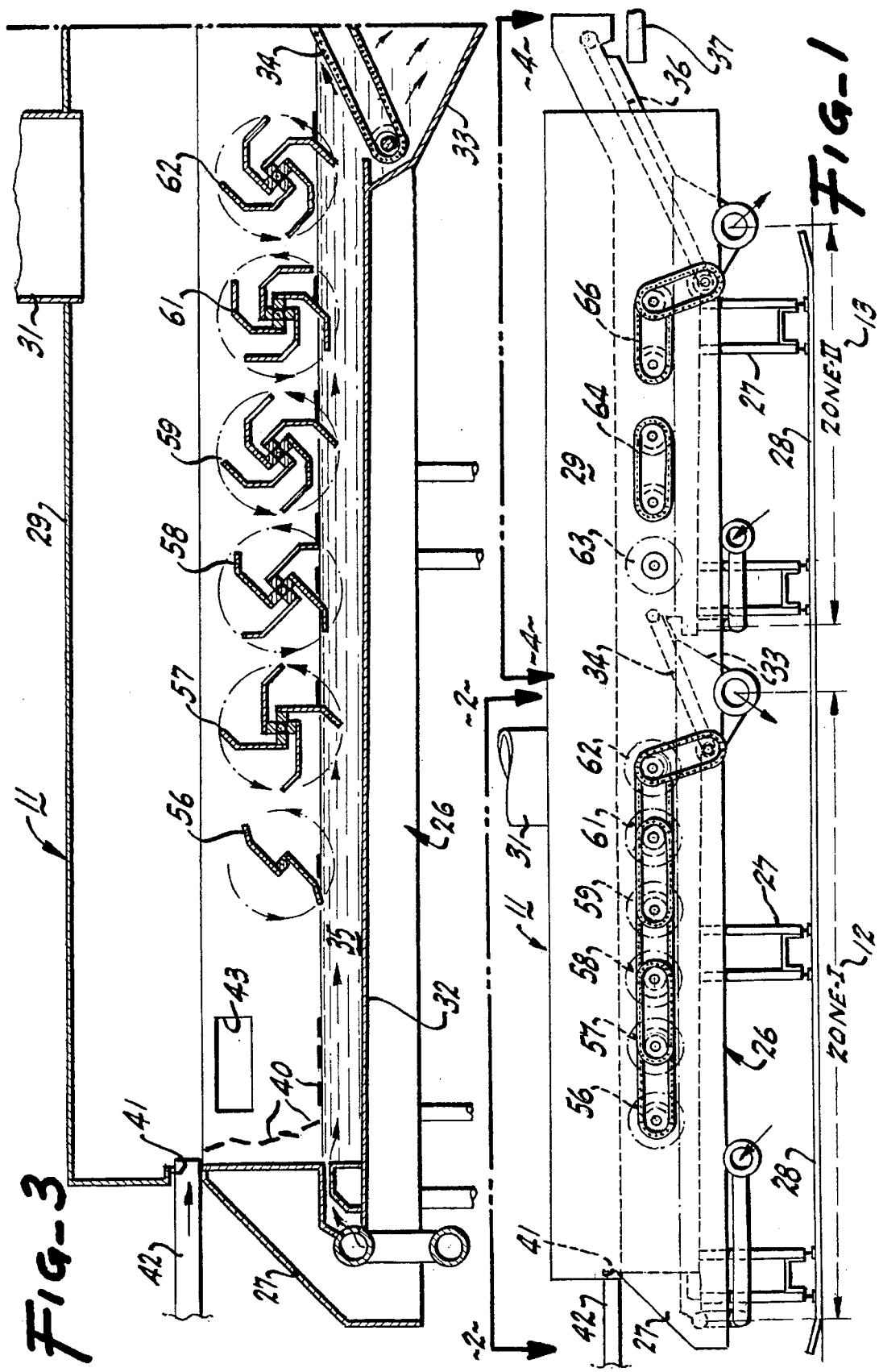

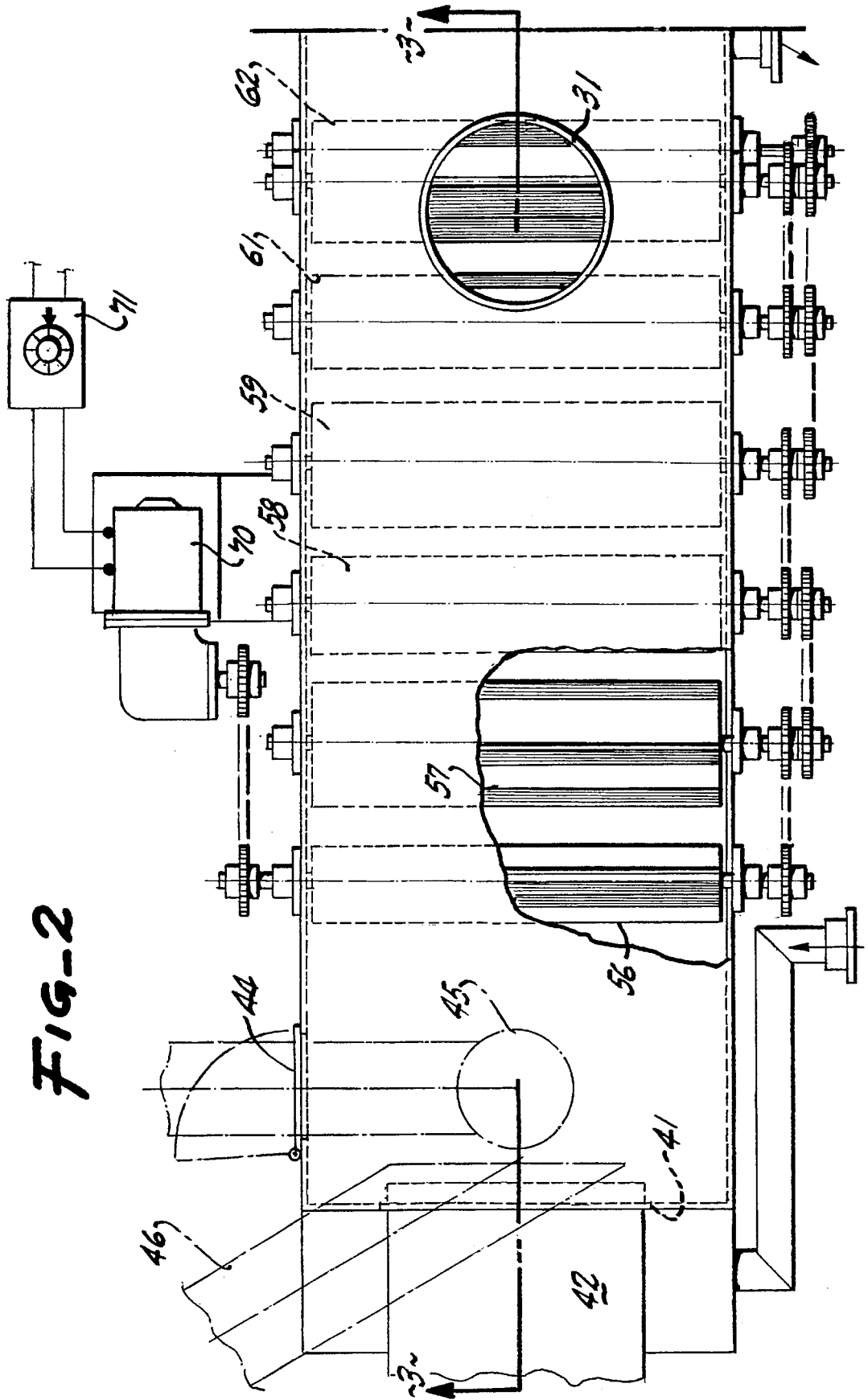

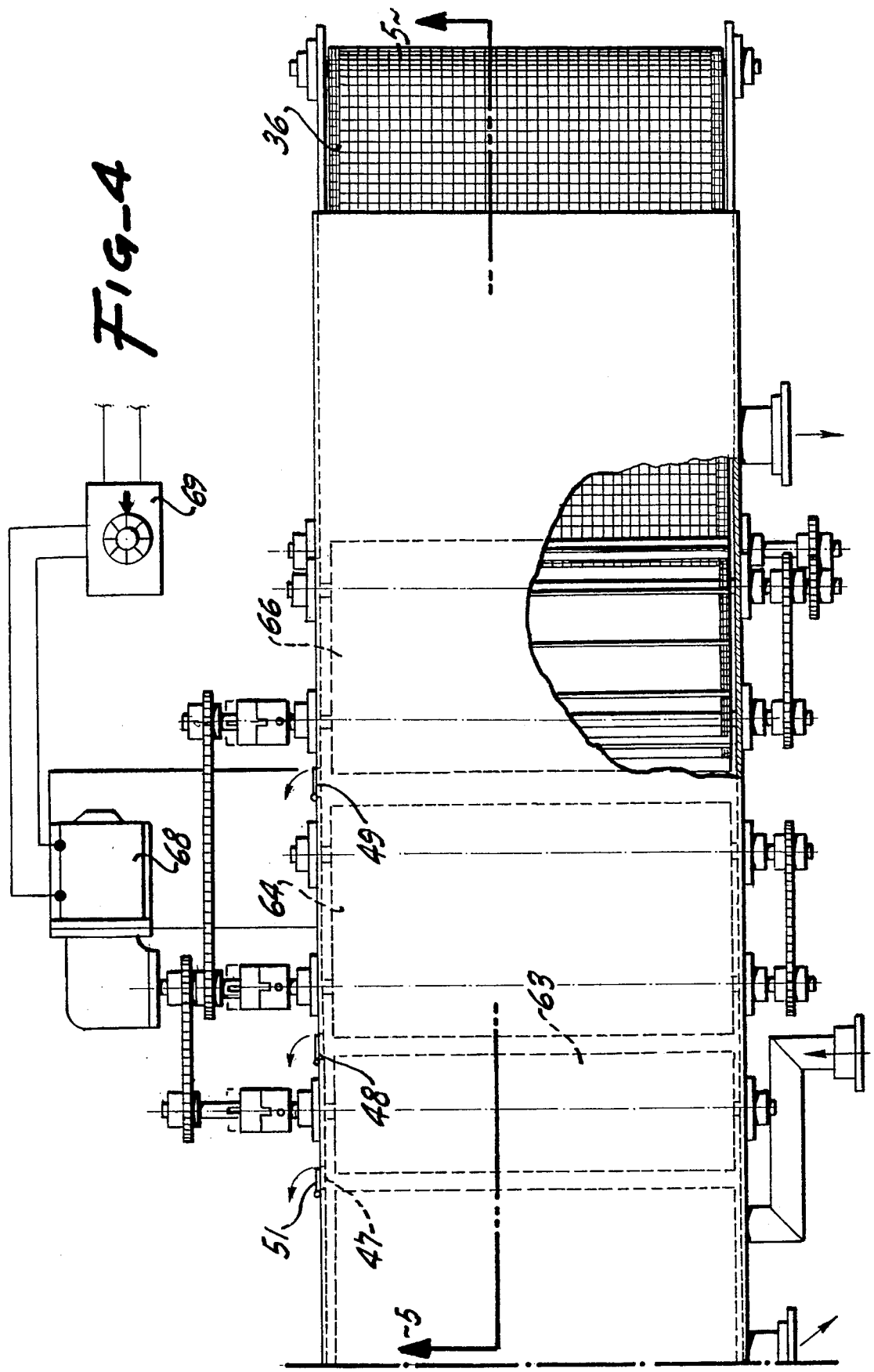

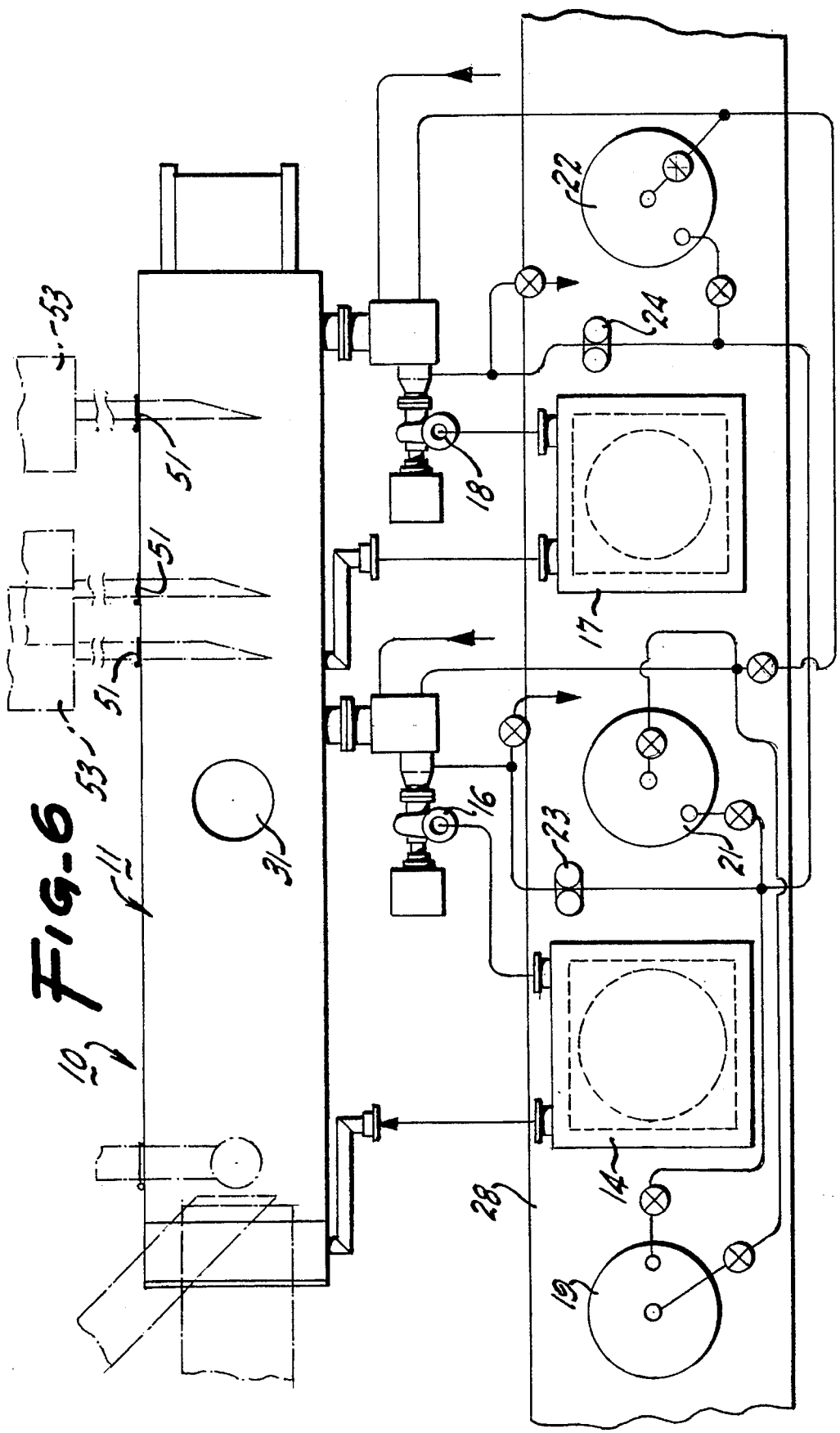

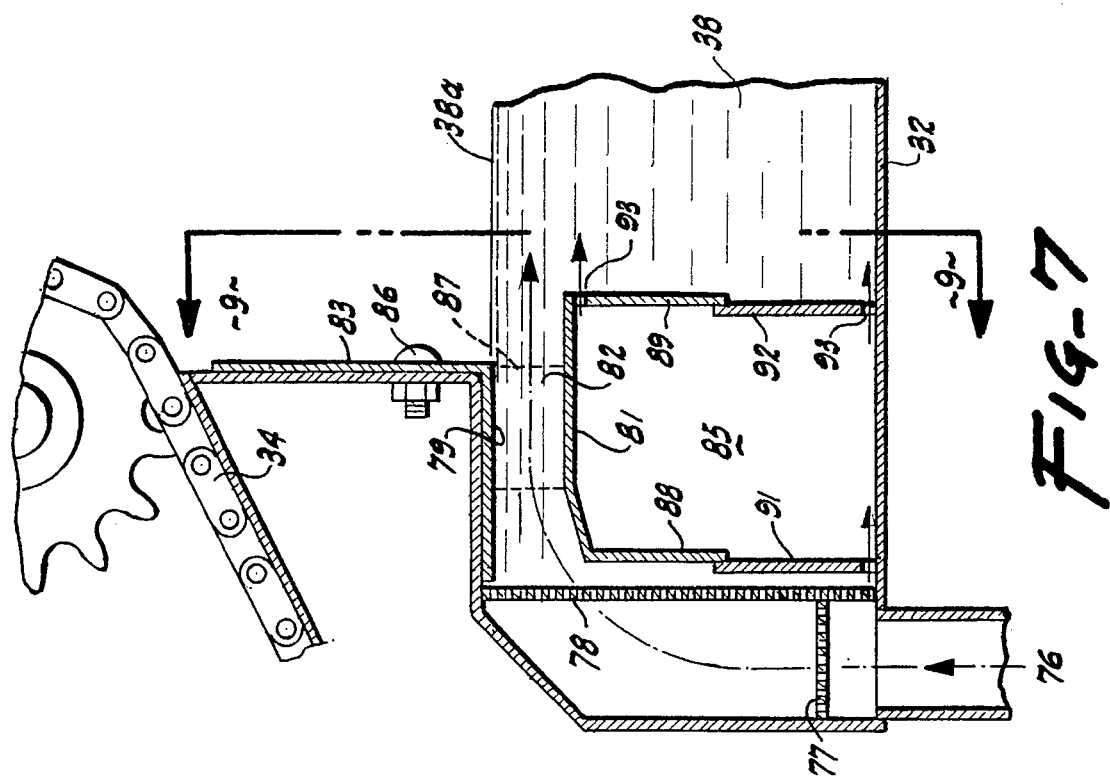
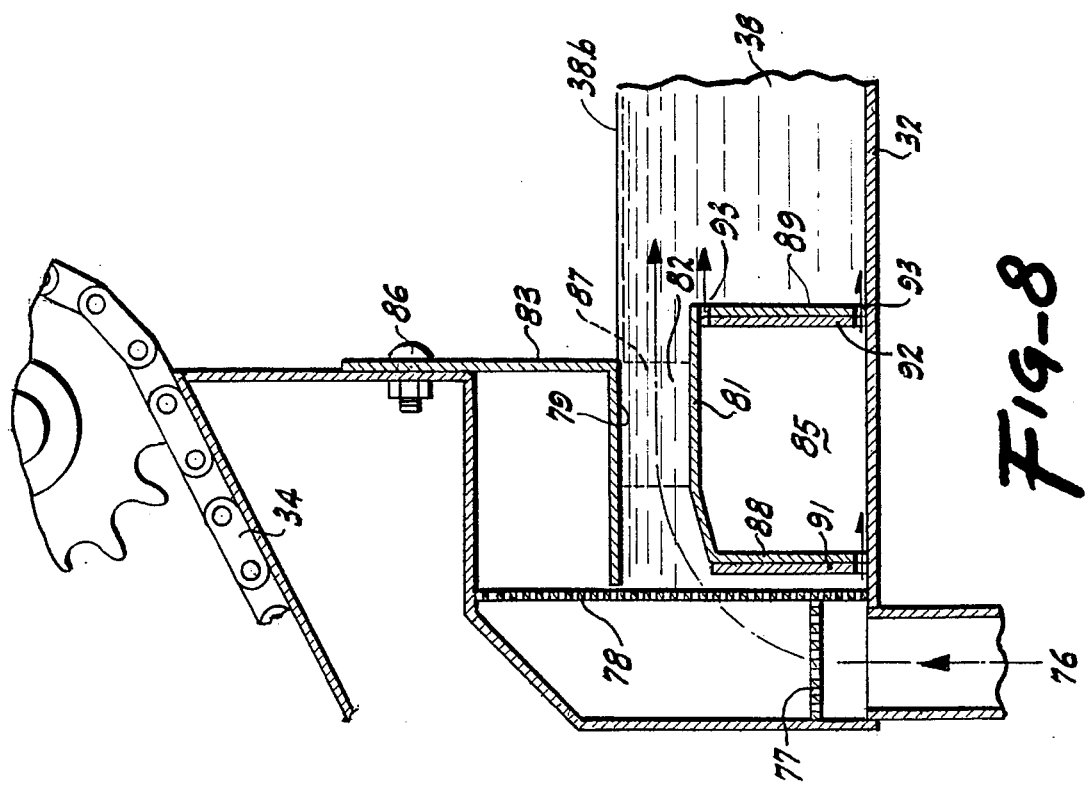

5,580,598

1
MULTI-PRODUCT FOOD COOKING SYSTEM

FIELD OF THE INVENTION

This invention relates to the food product cooking system and more specifically relates a cooking system which may be rapidly converted for cooking different products having widely differing time-temperature cooking profiles.

BACKGROUND OF THE INVENTION

In the snack food industry, it has been the general practice to dedicate equipment to the production of one, sometimes two, snack food products. For example, cookers are optimized for the production of potato chips and produce that product in great quantities and at rapid rates. Cookers also have been optimized for the production of tortilla chips and produce that product, as well as perhaps corn chips, in great quantities and to a high quality.

Similarly, for the production of pellet based snack food and extruded products, cookers have been optimized to cook those products in their relatively short cooking time requirements as compared to potato chip products. Such products include fried corn curls, pork skins, and other snack food products popped from pellets dropped into hot oil for a brief cooking period.

It is recognized that the aforementioned products have widely different time-temperature cooking profiles. The cooking of all of these products, however, is achieved in a bath of hot cooking oil in which the product is urged along by mechanical as well as oil flow means until reaching a point where the product is withdrawn from the oil and transferred to salting or seasoning equipment, as well as to a product cooler and later conveyed to a weighing and packaging station.

Potato chips are ordinarily cooked in hot oil at 325° to about 390° F. for a period of about 2 minutes 15 to 20 seconds. Tortilla chips are cooked at about 345° to 375° F. for about 45 to 60 seconds. Corn chips are cooked in hot oil at about 355° to 420° F. Pellet derived snack food products including pork skins are cooked in hot oil at about 390° to 400° F. for about 4 to 60 seconds with pork skins being in the 50 to 60 seconds cooking range.

In certain geographical markets for snack foods, it has been found unnecessary that there be produced on a regular basis vast quantities of an individual snack food product say, for example, potato chips. It is more desirable in these markets to produce relatively smaller quantities of many different snack food products so that a producer may cover a broader spectrum of the desired snack foods for the producer's distribution area. Because of the high capital cost, it is recognized that it is oftentimes economically impractical to dedicate several different pieces of equipment to different snack food products.

It has also been found that in certain areas of the world that it is desirable to be able to physically move snack food production equipment from one city to another or to another country so as to accommodate the different product demands as certain products become accepted and larger production equipment is needed. A readily convertible, easily transportable system for producing a wide variety of snack foods is a long sought after and much needed development. In the past, converting a cooker to accommodate a different product was quite cumbersome and generally involved downtime of the cooker on the order of a full work shift to convert from one product to another. Furthermore, certain snack food production equipment was cumbersome to transport readily from one locale to another to serve a different geographic market. If the equipment were able to be configured into modules sized for transport a very desirable economic objective would be realized.

The applicants, Clark K. Benson and Andrew A. Caridis, are among the named inventors on four U.S. patents which have been assigned to Heat and Control, Inc., South San Francisco, Calif. These are U.S. Pat. No. 4,738,193, granted Apr. 19, 1988; U.S. Pat. No. 4,942,808, granted Jul. 24, 1990; U.S. Pat. No. 5,137,740, granted Aug. 11, 1992; and U.S. Pat. No. 5,167,979, granted Dec. 1, 1992. These patents disclose cooking processes and apparatus flexibly adapted to cooking with a time-temperature profile conforming to either a linear or non-linear curve. Several different cooking zones are disclosed in U.S. Pat. No. 5,137,740, and product propulsion means including paddlewheels and submerger conveyors are disclosed in that patent whereas the equipment itself is generally physically large and dedicated for use in a single product production line.

SUMMARY OF THE INVENTION AND OBJECTS

In summary, the present invention is directed to a cooking system which is flexibly adapted for processing a number of products within a wide a range of different time-temperature cooking profiles. For ready transportability, a frame is provided upon which is mounted a cooker configured for at least two cooking zones, with each cooking zone having a plurality of product inlets and an outlet for products cooked. A product transfer conveyor arranged within the cooker serves to move certain products from the first cooking zone for further cooking in the second cooking zone. Each cooking zone includes a bath of cooking oil distinct from the cooking oil in the other zone. Each bath is provided with temperature controls, cooking oil heating and oil circulating means. Each cooking zone has a plurality of product inlet openings arranged above the oil bath and product propulsion means extend into the oil bath serving to urge the products during cooking at variable rates towards the product outlet. Control means are provided to permit temperature variations in each zone and the timing of the products moving through the zone so that a first group of products may be cooked initially in the first cooking zone and then finished cooked in the second zone. Other products may be cooked entirely in the second cooking zone while the first cooking zone is not in use.

An object of the invention is to provide a cooking system adaptable for handling a wide variety of snack food products, each having dissimilar time-temperature cooking profiles.

Another object of the invention is to provide a cooking system which is readily convertible from cooking one product to cooking another product which may be dissimilar from the first product, and all with a minimum amount of time required for the changeover of the system.

Yet another object of the invention is to provide a cooking system which is readily transportable from one locale to another.

A still further object is to provide a cooking system which is flexibly adapted to handle vastly different oil volumes in a manner that preserves the oil quality over a long period of useful life.

A still further object is to provide for a low capacity, multi-product cooking system which has dual oil baths wherein both or only one of the oil baths may be used at a time.

Still another object is to provide a cooking system which is flexibly adapted to producing relatively smaller runs of snack food products such as tortilla chips, potato chips, corn chips, and pellet snack food products.

Still another object of the invention is to provide an improved snack food cooking system which has variable speed product impulsion units to accommodate a wide range of product cook times as the product is carried through the cooking unit.

These and other objects will be seen from the description that follows taken in connection with the drawings.

BRIEF DESCRIPTION OF THE DRAWINGS

FIG. 1 is a side elevation view of the cooker used in the multi-product cooking system of the present invention;

FIG. 2 is an enlarged view taken in the direction of the arrows 2—2 in FIG. 1 and depicting cooking zone I of the present invention;

FIG. 3 is a sectional view in the scale of FIG. 2 taken in the direction of the arrows 3—3 in FIG. 2;

FIG. 4 is a view like FIG. 2 taken in the direction of the arrows 4—4 in FIG. 1 and showing cooking zone II of the present invention;

FIG. 6 is a view partially schematic and partially in plan of the cooking system of the present invention;

FIG. 7 is an enlarged, longitudinal sectional view taken as indicated by the broken line and arrows 7—7 in FIG. 5 showing one configuration of the cooking oil inlet in zone II for enabling a first cooking oil level;

FIG. 8 is a view like FIG. 7, but showing a second configuration of the cooking oil inlet in zone II for enabling a second cooking oil level.

DESCRIPTION OF THE PREFERRED EMBODIMENT

Figure 5:
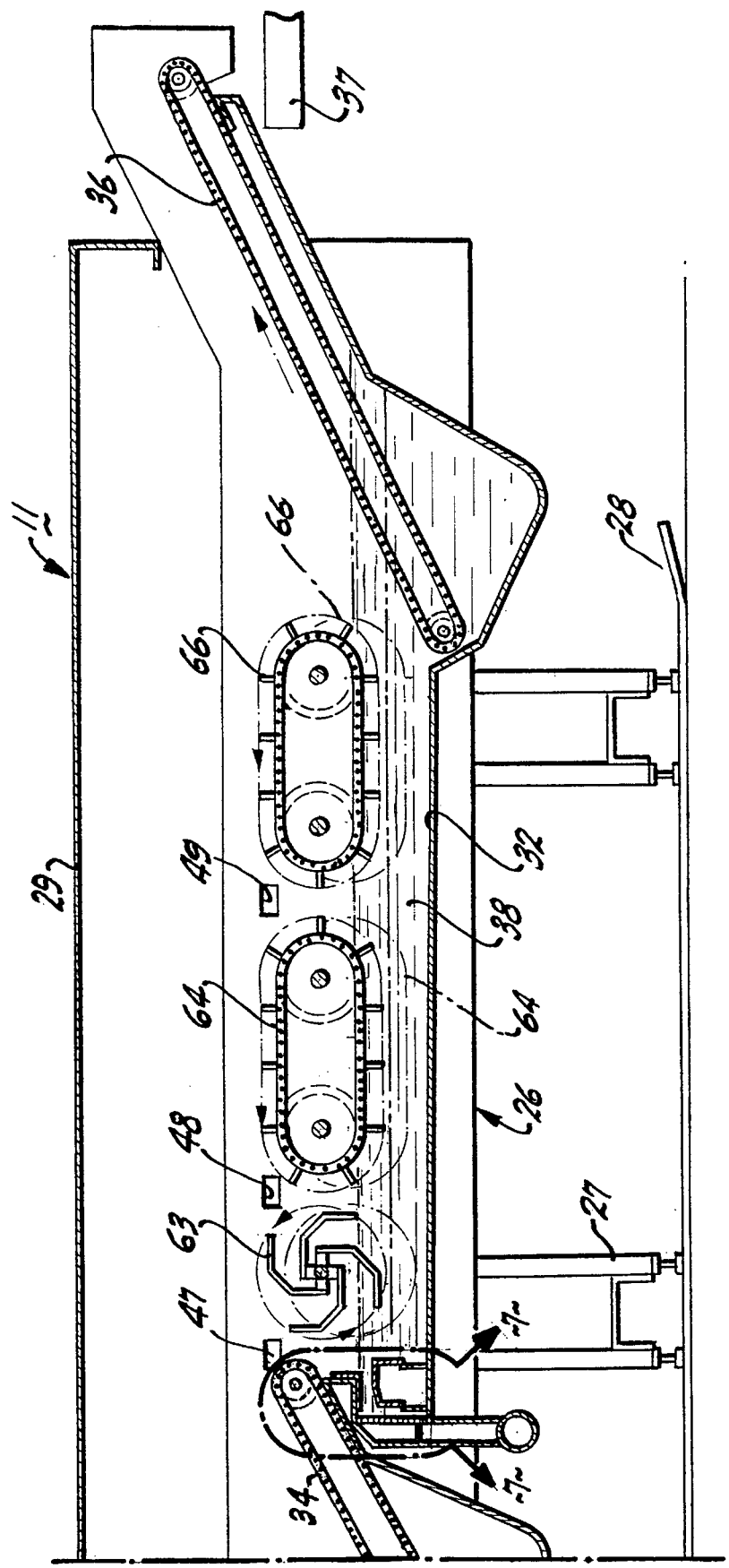
FIG. 5 is a sectional view taken in the direction of the arrows 5—5 in FIG. 4.

Referring first to FIGS. 1 and 6 of the drawings, a multi-product food cooking system 10 is there shown and includes a dual zone cooker 11 having zone I-12, and zone II-13, as indicated in FIG. 1. Zone I is provided with a heat exchanger 14 and circulating system for cooking oil 16, and zone II is provided with a similar but smaller capacity heat exchanger 17 and cooking oil circulating system 18. A plurality of oil holding tanks 19, 21 and 22 are piped to deliver oil through an oil transfer pump 23, 24, so that cooking oil for products such as potato chips, corn chips or tortilla chips may be delivered with respect to heat exchanger 14 into zone I of the cooker from either holding tank 19 or 21 as the cooking program dictates. Similarly, cooking oil from the oil holding tank 22 may be delivered via the oil transfer pump 24 into zone II and particularly when pellet popped products are to be produced by using zone II exclusively.

As shown in FIG. 6, the heat exchangers 14, 17, oil holding tanks 19, 21, 22 and the oil pumps 23, 24 are mounted in modular configuration upon a support platform 25 with dimensions on the order of 20 feet long by 6 feet wide for ease of over the road transport. The cooker 11 is also mounted in modular configuration upon a support frame and platform with dimensions on the order of 27½ feet by 5⅓ feet for ease of transport. Oil control valves, temperature sensors, oil volume indicating means, all well known in the field, are shown in circuit in FIG. 6 for realizing the cooking time and temperature control functions pertaining to the cooking system.

It will be understood that the multi-product cooking system of the present invention may be operated in a mode wherein products are cooked sequentially in zone I and then zone II with each zone having its own oil circulation, oil reheating, and temperature control system. Further, products may be cooked exclusively in zone II using oil such as from the holding tank 22 with heating and recirculation and temperature control being operated independently of the corresponding apparatus for zone I. In the case of operating zone II while maintaining zone I out of operation, the cooking oil for use in zone I may be returned to the oil holding tanks 19, 21 and there preserved out of contact with air or other contaminants which tend to raise the free fatty acid content of the cooking oil. Thus, the cooking oil is preserved for a longer service life than were it to remain in the oil bath in zone I.

Referring now particularly to FIGS. 1, 3 and 5, the cooker 11 comprises a housing 26 rigidly mounted upon a frame 27 which is supported upon a lower frame member footing 28 so that the cooker 11 may be moved as a unit such as when transporting on a truck or other conveyance from one geographical region to another.

The housing 27 includes a hood 29 which extends from one end of the cooker to the other and is provided with jacks (not shown herein) for raising the hood to facilitate cleaning and maintenance. A centrally disposed exhaust stack 31 extends vertically from the hood 29 and is coupled to an exhaust system (not shown) so that the cooking odors and vapors are controlled and recaptured to reduce atmospheric contamination.

The lower portion of the cooker 11 is referred to generally as the pan 32 and is configured to hold two separate oil cooking vats as indicated in FIG. 1 by the designations zoned I and zone II. Disposed between zone I and zone II is a transfer section 33 wherein the pan for zone I terminates and the cooking oil bath 35 is held therein. A transfer conveyor 34 extends laterally of the cooker the full width of the pan and is upwardly inclined from a position beneath the surface of the cooking oil 35 for zone I and terminates at a discharge end for dropping products into the oil bath 38 of zone II as clearly shown in FIG. 5. Thus, it will be understood that the oil level of zone I may be maintained at a lower level than the oil level of zone II and thus the quantities of oil present in the overall cooker may be at a lower volume than were a single oil bath used as is common in cookers of this general size, for example, a cooker of 20-foot cook length. For zone II, as shown in FIG. 5, the second oil bath 38 is maintained in a pan which may have a relatively higher oil level than that of the bath in zone I. The bath also is equipped with a product discharge conveyor 36 upwardly inclined from its submerged lower end for a moving product from zone II for transfer to subsequent operations including cooling, salting and seasoning and packaging and weighing. The product transfer conveyors 34 and 36 are driven by variable speed drive motors so that their speeds can be synchronized for the desired movement of product through and from the cooker 11. Thus, the under-the-hood transfer conveyor 34 serves to remove partially cooked products from zone I and to transfer them into zone II for further cooking. The discharge transfer conveyor 36 serves to remove the fully cooked products from the oil bath 38 in zone II onto a further processing conveyor 37 where other operations are performed upon the products.

The cooker housing 26 and particularly the hood 29 is equipped with a plurality of product inlets, the inlets being positioned above the selected oil levels along the cooking path at intervals appropriate to particular products. More specifically, a product inlet 41 is provided in the end wall of the hood 29 for the receipt of an endless belt conveyor 42 which serves to carry potato slices 40 from the potato slice preparation equipment into the cooker 11. The slices 40 free fall from the discharge end of the input conveyor 42 into the oil bath 35 there below.

A second product inlet 43 is arranged in one side wall of the hood 29 and the inlet 43 is sized so as to receive the extruder-cutter head of equipment for forming corn chips (not shown herein). A latchable door 44 is mounted on the hood 29 (FIG. 2) so that the inlet 43 may be closed by the door when the inlet is not in use.

The end inlet 41 is also equipped to receive a transfer conveyor for placing sheeted products into the oil bath 35, the conveyor 46 being indicated in broken lines in FIG. 2.

Referring now particularly to FIG. 5, product inlets 47, 48 and 49 are provided through the side wall of the hood 29 so that uncooked product may be fed into the oil bath of zone II through these inlet openings. Closure doors 51 are provided for each inlet 47, 48 and 49 as indicated in FIG. 4 so that the inlet openings may be selectively used or closed depending upon the product application being conducted through the cooking system 10. The inlets 47–49 serve to receive a vibratory feed conveyor 53 as indicated in FIG. 6. The conveyor discharged is inserted through the appropriate inlet according to the product cook time needed.

It will be understood from the above that uncooked food products are introduced into the cooker 11, and in the ease of zone I, products 40 including uncooked potato slices or sheeted corn products are introduced through the inlets 41 or 43 and are deposited in the oil bath 35 for cooking first in zone I and then being removed therefrom by the transfer conveyor 34 for further cooking in zone II and then removed therefrom by the discharge conveyor 36 for deposit onto the conveyor 37 for further treatment. The time that the product 40 remains in the cooking oil is of great importance as well as is the temperature of the oil baths in zone I and in zone II. Thus, it is important that the uncooked products be moved in a positive fashion through the two oil baths within a particular selected interval of time. To this end positive propulsion of the uncooked products through the bath is obtained through the multiple paddlewheels 56–59, 61 and 62, as shown in FIG. 3 for moving products through the oil bath of zone I. Six are shown by way of an example but fewer or more can be supplied depending upon the size of the cooker. As shown in FIG. 5, in the cooker's zone II, a paddlewheel 63 is provided as well as are the two product submerger-conveyors 64 and 66. As will be understood, the product propulsion means 63, 64 and 66 serve to urge products, which tend to float in cooking oil, through zone II and onto the discharge conveyor 36. It will be apparent that uncooked pellets introduced through the inlet 47 to drop into the hot cooking oil therebelow will be acted upon by the three mentioned propulsion elements, uncooked pellets introduced through inlet 48 will be acted upon by submerger conveyors 64 and 66 and further that uncooked pellets introduced through inlet 49 to fall into the cooking oil will be acted upon solely by the submerger conveyor 66. This is of importance in establishing the cook time in the hot cooking oil and rate of product flow through the cooking process of zone II.

The product propulsion units 63, 64, and 66 are driven through a variable speed drive train as indicated in FIG. 4 with suitable sprockets and drive chains mounted upon the submerger roller shafts in a manner well known in the field to be driven by an electric motor 68 equipped with the variable speed motor controller 69. This configuration enables accurate regulation of the rotational speed of the shafts and consequent operative product impulsion of the paddle wheel and the submerger conveyors. Further, for reasons which will be fully exposited below, means are provided (not shown) for raising and lowering the submerger conveyors so as to enable operation at different depths in the cooking oil contained in the pan of the cooker zone II so that the paddles and flights on the submerger conveyors will project a desired distance below the oil surface. Two vertically displaced positions of the product propulsion units 63, 64 and 66 is indicated by the full and the broken circular lines in FIG. 5.

Referring now to FIGS. 2 and 3, the paddlewheel assemblies 57–59, 61 and 62 of zone I are driven together by a drive train comprising drive chains and sprockets which are driven from the variable speed motor 70 with an associated motor controller 71. Through use of the controller 71, the paddlewheels may be regulated in their rotation speeds for advancing the uncooked potato slices, etc. through zone I and onto the transfer conveyor 34 for removal from the oil bath of zone I for further finishing cooking in zone II. Moreover, the speed of the product propulsion means of zone I may be selected with respect to the product propulsion means of zone II for accurately controlling the cook time of the particular snack food product. Moreover, the oil temperature in zone I may be closely controlled and the oil temperature in zone II may be similarly controlled to be at a lower or higher temperature depending upon the process, than the oil temperature in zone I.

By way of examples which reveal the flexibility of the disclosed cooking system the following table was prepared. Various useful cooking times and temperatures are listed for several different snack food products. Heretofore, it was typical for each of the different products to be cooked in a dedicated cooker. The disclosed cooking system, on the other hand, accommodates the cooking of all the below listed products as well as others not mentioned herein.

| Typical Cooking Time/and Cooking Oil Temperature Profiles | | | | |
| --- | --- | --- | --- | --- |
| Products | Zone I In (°F.) | Zone I Out (°F.) | Zone II In (°F.) | Zone II Out (°F.) | Total Cook Time Min–Sec |
| Regular Potato Chips | 340–350 335–340 | 320–330 315–320 | 340–350 355–360 | 320–330 325–330 | 2–15 2–15 |
| Wavy Potato Chips | 340–350 335–340 | 320–330 315–320 | 340–350 355–360 | 320–330 325–330 | 2–45 2–45 |
| Tortilla Chips | 355–360 365–370 355–360 | 345–350 355–360 350–355 | 360–355 365–360 370–365 | 355–350 360–355 365–360 | 1–15 1–10 1–05 |
| Corn Chips | 405–410 410–415 | 400–405 405–410 | 400–405 405–410 | 395–400 400–405 | 1–20 1–15 |
| Extruded Pork Skins | Dormant | | 390–400 | 380–390 | 50–60 seconds |
| Corn Curls | Dormant | | 370–380 | 360–370 | 40–60 seconds |

Typical Cooking Time/and Cooking Oil Temperature Profiles

| Products | Zone I In (°F.) | Zone I Out (°F.) | Zone II In (°F.) | Zone II Out (°F.) | Total Cook Time Min–Sec |
| --- | --- | --- | --- | --- | --- |
| Popped Pellets (Many Types) | Dormant | | 370–400 | 365–395 | 5 to 20 seconds |

It is evident from the examples above that several different snack food products may be cooked in the disclosed cooking system using the two zones in tandem or the second zone solely. Regular surface standard potato chips can be cooked in the two zones at the same temperature range as wavy surface potato chips but with different cooking times, with the regular potato chips taking some 30 seconds less than the wavy potato chips. Tortilla chips may be cooked in the two cooking zones using a higher initial oil temperature in Zone II than the initial oil temperature in Zone I. The cook times and temperatures may be regulated and controlled to achieve a desired product result which is commercially acceptable. The time/temperatures profiles for the two cooking zones for corn based snack food products may be dictated by the quality of the masa from which the chips are made.

The extruded corn chip products are cooked in the combination of Zones I and II in what is a generally uniform or flat temperature curve with the uncooked products being introduced into Zone I through the inlet opening 43.

As mentioned, the cooking system is adapted for cooking rapidly expanding products such as pork skins, corn cuffs and the many types of popped pellets. In these cooking applications Zone I remains dormant while the products are cooked in the necessary relatively short cooking times in Zone II. As may be seen from the Table above, the cook times may be as short as 5 seconds and as long as 60 seconds. Pork skins and the like, which have the relatively longer cook times, may be introduced into Zone II through the product inlet 47 and will free fall into the cooking oil bath 38 to be propelled therethrough by the paddlewheel 63 and the submerger conveyors 64 and 66. The product is then removed from the oil bath by the second transfer conveyor 36.

Corn curls, which are cooked in Zone II at a somewhat shorter cook time than pork skins, may be introduced through the product inlet opening 48 to free fall into the oil bath 38. The corn curls will be moved through the oil bath by the submerger conveyors 64 and 66, and thence are carried out of the unit by the second transfer conveyor 36. Popped pellets require a relatively short cooking time and may be introduced into the cooking system through the product inlet 49. The pellets may free fall into the oil bath in Zone II to be engaged by the submerger conveyor 66 and removed from the oil bath 38 by operation of the transfer conveyor 36.

Snack food products such as pork skins, corn chips and popped pellets require a relatively short cook time and, for these products, it is desirable to use a lower volume of oil in the oil bath of Zone II 38 than if potato chips and the like were being processed through Zone II. Thus, provision is made in Zone II to accommodate different volumes of oil, the larger oil volumes being used in connection with cooking of the potato chips and the like, and the smaller oil volumes employed when popped pellets and the like are being cooked. Referring to FIGS. 5, 7 and 8, the larger oil volume or higher oil level in Zone II is indicated at 38a and the lower oil volume and lower oil level is indicated at 38b. Means are provided for the product propulsion units, the paddlewheel 63, submerger conveyor 64, and submerger conveyor 66, to operate effectively at both the upper oil level 38a as well as at the lower oil level 38b. It is provided in a manner well-known in the field for the vertical adjustment of these components so that the necessary projection into the oil bath is realized. In FIG. 5 the aforementioned components in their lower position are indicated by the broken and dashed lines.

Some of the benefits of employing the smaller volume of oil bath in Zone II is a lower cost for the oil employed, the reduction of oxygen exposure and consequent build-up of free fatty acids in the oil bath, and the case of refreshing and reheating a smaller volume of oil than were a larger volume in place. The manner of introducing oil into Zone II is of some concern, both in the case where popped or expanded products are cooked as well as in situations where chipp products are cooked. One important criteria is that the input of oil be such that uncooked products are not trapped by eddies and turbulence in the oil inlet area, because when this happens the resulting products are overcooked, which is undesirable. Provisions are made at the oil inlet end of Zone II to encourage product flow away from the inlet as shown in FIGS. 7–9.

More particularly, the cooking oil inlet 76 receives oil from the heat exchanger 17 (FIG. 6) and the incoming oil is dispersed to move laterally by a perforated plate 77 horizontally disposed in confronting relationship with the oil inlet 76. The plate 77 extends the width of the pan 32 and is fixedly secured to a vertical perforated plate 78, which serves to keep product out of the oil inlet area while permitting the incoming oil to flow and disperse across the width of the pan 32. Upper and lower horizontal baffles 79, 81 define an oil flow slot 82 extending across the pan through which the oil flows mostly, it is believed, in a laminar and in a non-turbulent condition. This is to encourage the products to move away from the oil inlet so as not to dwell and overcook in that location.

The upper horizontal baffle 79 engages at one end with the vertical perforated plate 78, and at its other end is equipped with an upstanding flange 83, which is provided with a plurality of vertically extending slots 84, which receive fasteners 86 permitting the vertical adjustment of the baffle 79 as indicated in FIGS. 7 and 8 to accommodate respectively the higher oil level 38a and the lower oil level 38b.

Figure 9:
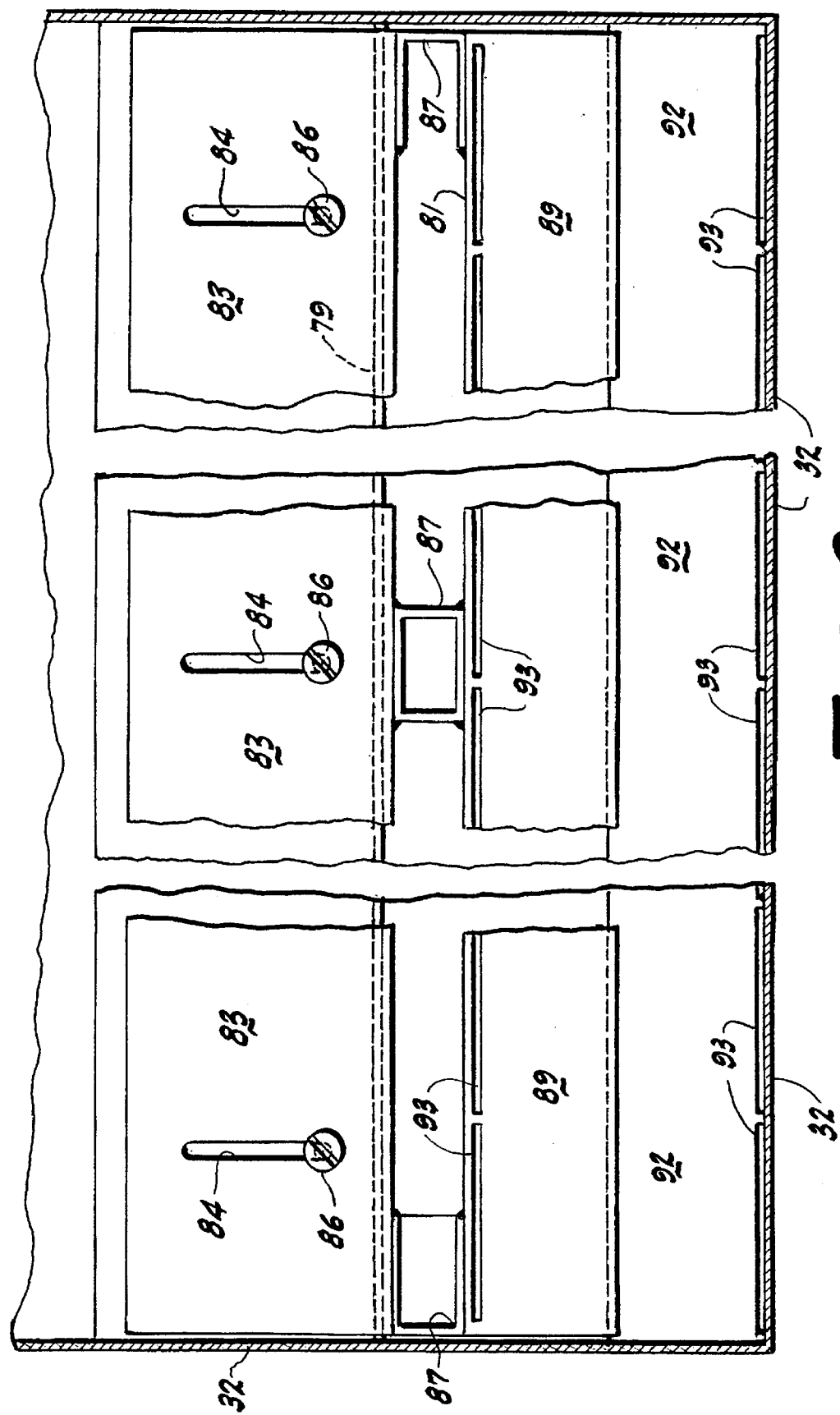
FIG. 9 is a transverse sectional view, partially broken away, taken in the direction of the arrows 9—9 in FIG. 7.

The flow slot 82 defined by the horizontal baffles 79, 81, is insured of a constant width by the spacer members 87 fixedly secured to the baffles, best shown in FIG. 9. The lower horizontal baffle 81 is equipped with depending, vertically extending flange plates 88 and 89. The plates 88 and 89 are arranged to fit closely against in a sliding fit with the upstanding plates 91 and 92 secured to the bottom of the pan and extending thereacross as shown clearly in FIG. 9. It is apparent that in this construction, when the vertical flange 83 is raised or lowered, such as moving between the positions of FIG. 7 and FIG. 8, that the lower baffle 81 and the flow slot 82 consequently is relocated. The provision of the box-like baffle construction associated with the bottom of the pan affords a substantial distance for the oil to flow over the baffle 81 before the full depth of oil is reached in the pan. This provision is made to reduce turbulence in the oil inlet area.

To further control the formation of eddies in the oil inlet area of Zone II, slots are provided in the oil control inlet box 85 as signified by 93 in FIG. 9. The oil flow slots 93 permit oil to flow away from the baffle plates to discourage and control eddies in that region.

By means of the present apparatus and related process, a wide variety of snack food products having great consumer appeal can be produced. The resulting products have the desired texture, taste and appearance or typical products produced with much more expensive and elaborate equipment dedicated exclusively to such products. The apparatus disclosed herein is economical to manufacture and operate and is easy to convert for producing different products. The equipment is arranged for facile transport from one location to another and mentioned in the objects and advantages above.

While we have shown and described above what is considered to be a preferred embodiment of our invention in the multi product cooking apparatus and the process related thereto, we do not limit ourselves to the exact details of the constructions set forth or to the time/temperature data disclosed, and our invention embraces such changes, modifications, and equivalents of the parts and their formation and arrangement as coming within the purview of the terms of the claims, which follow below.

We claim:

1. A cooking system flexibly adapted for processing a number of comestible products having a range of different time and temperature cooking profiles, comprising a frame, a cooker mounted upon said frame and including therein at least first and second cooking zones, each having a plurality of inlets for receiving different products to be cooked and an outlet for products having been cooked, said cooker including a cooking vapor containment hood means extending over said first and second cooking zones and having an exhaust stack thereon, product transfer means within said containment hood extending between the outlet of said first cooking zone and one of the inlets of said second cooking zone serving to move certain products from an initial cooking stage in the first zone to a further cooking stage in said second cook cooking zone, each cooking zone comprising means for holding a bath of cooking oil distinct from the cooking oil held in the other cooking zone, first means for holding, temperature controlling, heating and circulating a first supply of cooking oil to said first cooking zone, second means for holding, temperature controlling, heating and circulating a second supply of cooking oil to said second cooking zone, each cooking zone having a plurality of inlet openings arranged above the oil bath for receiving product therethrough for cooking in the oil, product propulsion means extending into the oil bath arranged in each of said zones and operable to urge the products during cooking at selected variable product propulsion speeds from the product inlet to the product outlet, and control means serving to permit simultaneous operation of said first and second means for temperature controlling, heating and circulation of the cooking oils so that a first group of products may be cooked initially in said first zone and then finished cooked in said second zone, and further serving to permit selective operation of said second means for temperature controlling, heating and circulation of the cooking oil so that a second group of products may be cooked entirely in said second cooking zone while said first cooking zone is maintained substantially out of operation.

2. The subject matter of claim 1 wherein means are provided to supply and maintain in said second cooking zone a cooking oil bath at selectively different depths as needed for processing different products through said zone.

3. The subject matter of claim 2 wherein said means include a vertically adjustable oil inlet mechanism configured so that the incoming cooking oil is dispersed laterally of the cooking zone and including flow control slot means serving to provide oil flow against the back eddies adjacent to the oil inlet, thereby affording control of the oil flow at different oil levels in said second cooking zone.

4. The subject matter of claim 1 wherein said product propulsion means includes rotatable paddle wheel mechanisms having portions projecting into the cooking oil and serving to urge the products during cooking towards the product discharge and product submerger mechanisms having portions projecting into the cooking oil and serving to move the products during cooking towards the product discharge and to insure the products are held beneath the oil surface during cooking.

5. The subject matter of claim 4 wherein said second cooking zone said product propulsion means are selectively vertically shiftable over a range affording effective operation at selected oil depths in said second zone.

6. The cooking system of claim 1 wherein said system is configured in modules for portability and transport, one module including said first, and second means for holding, temperature controlling, heating and circulating said supplies of cooking oil, said last named means being mounted upon frame means for transport, and said second module including said cooker and the said frame upon which said cooker is mounted.

7. A process for cooking snack food products in cooking oil, comprising the steps: providing a cooker equipped to contain at least two separate oil baths and having means for lifting and transferring products out of a first bath and into a second cooking oil bath during the cooking process, preparing cooking oil for the first bath in which a product is initially received at a first temperature for cooking the product, preparing cooking oil for the second bath at a predetermined temperature which may be the same as, higher or lower than said first oil temperature of the first bath, maintaining and controlling the temperature of the oil in the first bath by circulating the oil to heating means arranged in an oil circulation circuit distinct from the oil circulation circuit for the second bath, introducing a product for cooking into the first oil bath and transporting the product in the bath for a predetermined first cooking time, removing the product from the first oil bath in an undercooked state and then introducing the undercooked product into the second oil bath for finish cooking, transporting the product through the second oil bath and then removing the product therefrom.

8. The process of claim 7 wherein the product is introduced into the first oil bath by free falling and is introduced into the second oil bath by free falling.

9. The process of claim 7 wherein the product cooking time and temperature in said first bath differs from the cooking time and temperature in said second bath.

10. A process for cooking snack food products in cooking oil, comprising the steps: providing a cooker equipped to contain at least two separate oil baths and having means for lifting and transferring products out of a first bath and into a second cooking oil bath during the cooking process, preparing cooking oil for only the second of the two cooking baths while maintaining the first oil bath dormant, maintaining and controlling the temperature of the oil in the second bath by circulating the oil to heating means arranged in an oil circulation circuit dedicated to said second bath, introducing a product by free fall into the cooking oil bath and transporting the product in the bath for a predetermined cooking time, transporting the product through the oil bath and then removing the product therefrom in a fully cooked condition.

11. The process of claim 10 wherein the product is submerged into the body of cooking oil while being transported in the oil bath.

12. The process of claim 7 wherein the product is submerged into the body of cooking oil while being transported in the second oil bath.

13. The process of claim 7 wherein the product cooked in the process is a snack food product taken from a group consisting of potato chips, corn chips and tortilla chips.

14. The process of claim 10 wherein the product cooked in the process is a snack food product taken from a group consisting of pork skins, corn curls and popped pellets.

* * * * *